(12) United States Patent
Vijapur Gopinath Rao et al.

(10) Patent No.: US 11,593,676 B2
(45) Date of Patent: Feb. 28, 2023

(54) NATURAL LANGUAGE PROCESSING AND MACHINE LEARNING ASSISTED CATALOGING AND RECOMMENDATION ENGINE

(71) Applicant: PayPal, Inc., San Jose, CA (US)

(72) Inventors: Ramnarayan Vijapur Gopinath Rao, Chennai (IN); Rajkumar Baskaran, Vellore (IN); Venkatesh J. Ramesh, Madurai (IN); Suresh Kumar Durairaj, Chennai (IN); Kartik Srikantan, Chennai (IN)

(73) Assignee: PayPal, Inc., San Jose, CA (US)

( * ) Notice: Subject to any disclaimer, the term of this patent is extended or adjusted under 35 U.S.C. 154(b) by 502 days.

(21) Appl. No.: 16/704,025

(22) Filed: Dec. 5, 2019

(65) Prior Publication Data

US 2021/0174221 A1   Jun. 10, 2021

(51) Int. Cl.

| | | |
|---|---|---|
| *G06F 16/00* | (2019.01) | |
| *G06N 5/04* | (2023.01) | |
| *G06F 16/245* | (2019.01) | |
| *G06F 40/30* | (2020.01) | |
| *G06N 20/00* | (2019.01) | |
| *G06F 16/28* | (2019.01) | |

(52) U.S. Cl.
CPC .............. *G06N 5/04* (2013.01); *G06F 16/245* (2019.01); *G06F 16/285* (2019.01); *G06F 40/30* (2020.01); *G06N 20/00* (2019.01)

(58) Field of Classification Search
CPC .............. G06F 16/9535; G06F 16/2457; G06F 16/2425; G06F 16/24578; G06F 16/355; G06F 3/165; G06F 3/167; G06F 16/2246; G06F 16/287; G06F 16/583; G06F 16/9537; G06F 40/30; G06F 8/76; G06F 9/3005; G06F 9/3891; G06F 9/45508; G06F 9/5061; G06F 16/245; G06F 16/285; G06F 16/3329; G06F 16/35; G06F 16/353; G06F 40/20; G06F 40/35; G06N 20/00; G06N 5/048; G06N 5/04; G06N 5/045; G06N 3/04; G06N 3/08; G06N 5/022

See application file for complete search history.

(56) References Cited

U.S. PATENT DOCUMENTS

| | | | | |
|---|---|---|---|---|
| 7,225,368 | B2 * | 5/2007 | Lancaster ........... | G06F 11/0706 714/48 |
| 2003/0115508 | A1 * | 6/2003 | Ali ........................ | H04L 69/40 714/43 |
| 2015/0339376 | A1 * | 11/2015 | Wieweg .............. | G06F 16/3344 717/145 |

* cited by examiner

*Primary Examiner* — Yicun Wu
(74) *Attorney, Agent, or Firm* — Haynes and Boone, LLP

(57) ABSTRACT

Systems and methods that determining a solution for a real-time message are provided. Multiple messages of different types are received from multiple platforms. The messages were generated in response to errors caused by applications monitored by the platforms. For each message, a language processing system determines the content of the message and the machine learning system determines a classification of the message. The set of message candidates are generated by comparing the classification and the content of the message to historical messages. From the set of message candidates, solution messages are identified. A recommended solution is determined from the solution messages.

20 Claims, 6 Drawing Sheets

NATURAL LANGUAGE PROCESSING AND MACHINE LEARNING ASSISTED CATALOGING AND RECOMMENDATION ENGINE

TECHNICAL FIELD

The disclosure generally relates to monitoring platforms, and more specifically to classifying live events generated by the monitoring platforms using natural language processing and machine learning.

BACKGROUND

Conventionally, a monitoring system determines issues in an application. However, the monitoring system does not catalogue or track these issues. Because the issues are not tracked, repeating issues may manifest themselves over time but be ignored. Also, resources used to resolve the issues may be wasted because each time the repeating issues are resolved from scratch. Further, monitoring systems that do not track issues may not identify issue trends that lead to identifying issue hotspots.

Figure 1A:
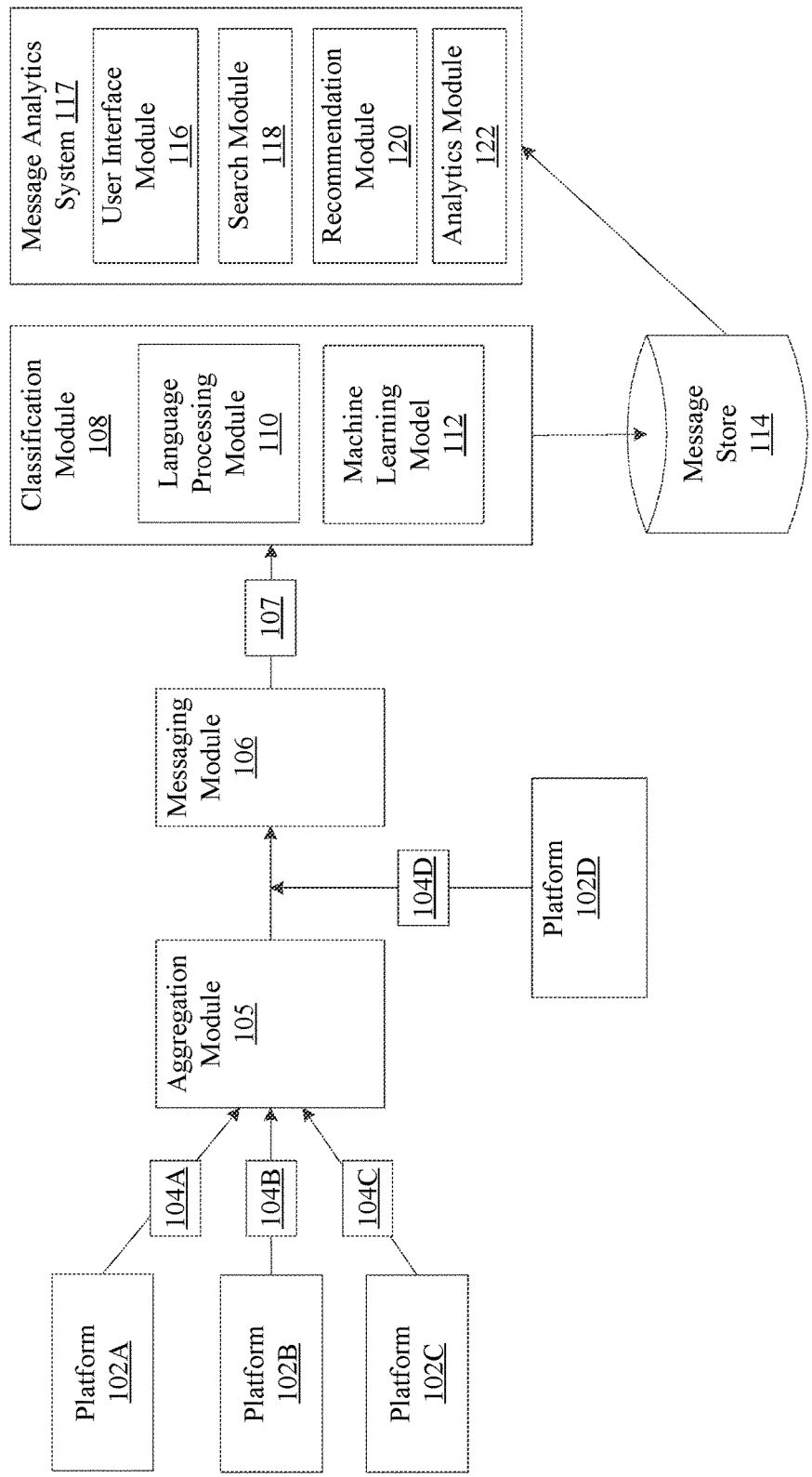
FIG. 1A is a block diagram of an issue monitoring system, according to an embodiment.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The embodiments of the disclosure describe a monitoring system that recommends solutions for errors that were generated by multiple applications. Unlike conventional monitoring systems, the embodiments below describe a monitoring system that may receive error messages from multiple platforms, where the platforms monitor different applications, and generate real-time error messages having different types and formats.

The embodiments of the disclosure describe a monitoring system that includes a classification module with a language processing module and a machine learning model. The classification module classifies the messages into different message types and understands the content of the messages. Using the classifications and the content of the messages, the monitoring system recommends solutions to the error messages based on the historical messages.

The embodiments of the disclosure all describe training the classification module on the historical messages so that the classification module can classify the real-time messages and identify solutions for the messages.

FIG. 1A is a block diagram 100A of an exemplary monitoring system where embodiments can be implemented. Although the embodiments below are described with respect to the issues generated on various platforms, the embodiments are also applicable to other types of systems that receive, process, and track data.

In an embodiment, the monitoring system includes one or more platforms, shown as platforms 102A-C. Platforms 102A-C may track issues related to applications or software that platforms 102A-C execute, connect to, and monitor. Platforms 102A-C may track issues during different stages of the software lifecycles, including development, testing, and production cycles. Example applications may be mobile applications, payment applications, social networking applications, analytics applications, communication applications, such as email, texting, voice, and instant messaging applications, location detection applications, such as a mapping, compass, and/or global positioning system (GPS) applications, merchant applications, etc. For illustrative purposes only, platform 102A may track payment applications, platform 102B may track social networking applications, and platform 102C may track analytics applications. In some instances, platforms 102A-C may all track different payment applications that generate different types of errors in the same or different formats. For example, platform 102A may track a first payment application, platform 102B may track a second payment application, and platform 102C may track a third payment application. As applications execute, various applications may encounter issues or errors, and may generate or may cause platforms 102A-C to generate error messages. Because the applications may be non-overlapping and distinct, platforms 102A-C may track numerous issues that are generated by a wide variety of applications and in a wide variety of formats.

In some embodiments, when applications encounter an error, issue or otherwise act in an unexpected manner, platforms 102A-C associated with applications may generate messages 104A-C. With respect to an example above, platform 102A may generate messages 104A that are associated with issues caused by payment applications, platform 102B may generate messages 104B that are associated with issues caused by social networking applications, and platform 102C may generate messages 104C that are associated with issues caused by analytics applications. Messages 104A-C may include content associated with failures, errors, and other unexpected behavior. Example content may be a file missing from an expected folder referenced by an application, a path to a folder that does not exist, a memory exception, an out of memory error, a permission error, an error that occurs when a database executes a query, an error generating an output file, a reference corrupted data, a timeout exception, etc. Because messages 104A-C are generated by different platforms 102A-C, messages 104A-C may be in different formats, such as email format, text messaging format, application specific format, etc. Email format may be format that corresponds to an email platform and that may include at least a source and destination fields, e.g. "To" and "From," a "Subject" field, and content associated with an error. The email format may also include a date and time one of platforms 102A-C generated one of messages 104A-C, the name of the application, etc. The text messaging format may be the format that corresponds to a text messaging platform and may include, in a non-limiting embodiment, a name of the platform from platforms 102A-C that generated one of messages 104A-C, the content associated with the error, and a destination name and/or number. The application specific formats may include fields that are specific to an application or platform that generated messages 104A-C and may at least include the content associated with the error along with some or of fields discussed above. Further, in some instances messages 104A generated by platform 102A may be in an email format, messages 104B generated by platforms 102B may be in a text message format, and messages 104C generated by platform 102C may be in a message format that is specific to platform 102C.

In some embodiments, the monitoring system in block diagram 100A may include an aggregation module 105. Aggregation module 105 may receive messages 104A-C generated by platforms 102A-C. Aggregation module 105 may aggregate messages 104A-C, such that aggregated messages 104A-C may appear as though messages 104A-C have been generated by a single source.

In an embodiment, the monitoring system may also include a platform 102D. Platform 102D may be an external platform developed by a different entity from platforms 102A-C. Example platform 102D may be an application lifecycle management platform or an information technology management platform. Platform 102D may also monitor applications and generate issues encountered or caused by applications in real-time. Unlike platforms 102A-C, platform 102D may not generate messages. Instead, platform 102D may generate an RSS (really simple syndication) feed, JSON (JavaScript Object Notation) feed, or another type of feed that logs events generated by applications monitored using platform 102D.

In an embodiment, the monitoring system may include a messaging module 106. Messaging module 106 may receive and standardize messages 104A-C. For example, messaging module 106 may remove repeating words, unnecessary characters, etc., from messages 104A-C. Messaging module 106 may also standardize messages 104A-C into a common format that preserves content and/or metadata in messages 104A-C. Further, since platform 102D uses RSS, JSON or another feed to generate events, messaging module 106 may also extract data that may represent errors, issues, etc., caused by an application that is monitored by platform 102D and populate the data into a template, such as a JSON template. The template may have fields that store words and metadata that may identify an issue or an error associated with an application that executes on platform 102D. The template with the data from the RSS, JSON, or another feed that indicates an error, issue, etc., may be collectively referred to as a message 104D. Messages 104D may also be standardized and formatted into the same format as messages 104A-C. In an embodiment, the output of messaging module 106 that includes standardized messages 104A-D may be referred to as messages 107.

Conventionally, the issues tracked by individual platforms are not aggregated, catalogued or tracked. This means that the same issue may occur within the same platform or across different platforms multiple times. However, because the issues are not catalogued, the underlying cause of the issues may be overlooked. Further, because the issues are not catalogued, there may be wasted resources, time, and effort in repeatedly finding solutions for the same issue. Further, because the issues are not catalogued, the issues may not be analyzed to determine trends that may identify hotspot areas caused by applications.

In an embodiment, the monitoring system includes a classification module 108. Classification module 108 may receive messages 107 that originate at different platforms 102A-D, apply natural language processing techniques to understand content of messages 107 and classify messages 107 into different message types. In some embodiments, classification module 108 may include a language processing module 110 and a machine learning module 112. Language processing module 110 may analyze the content and metadata in messages 107. For example, if messages 107 include content written in a natural language and include text, language processing module 110 may apply linguistic analysis to the text. As part of the linguistic analysis, for each message in messages 107, language processing module 110 may tag the originating application, the sender and the receiver, location, date, time, IP address, sender and/or receiver device identifier, and words indicative of an issue, etc. Based on the linguistic analysis, language processing module 110 may also identify relationships and dependencies between the words in each message of messages 107 and use the relationships and words to understand the content of message 107.

In an embodiment, machine learning model 112 may receive the tags and relationships for each message in messages 107 from language processing model 110. Based on the tags and relationships, machine learning model 112 may classify the message into a message type. Non-limiting message types may be an issue or error message, a conversation message, a resolution message, and a success message, in some embodiments. In an embodiment, machine learning model 112 may use logistic regression to classify messages by determining probability values that identify probabilities that a message is of a particular type, and then associate a message type having the largest probability with the message. In an embodiment, machine learning model 112 may use content of message 107 to link or establish relationships among messages 107 that have different types. For example, machine learning model 112 may establish a relationship between a message classified as an error message and a message classified as a resolution message for the error message.

Figure 1B:
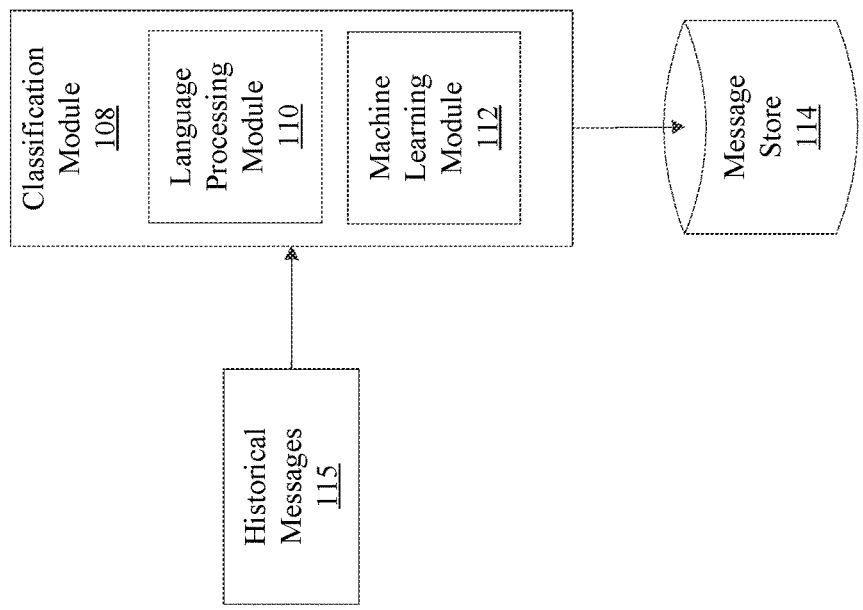
FIG. 1B is a block diagram of a classification module, according to an embodiment.

In an embodiment, prior to classification module 108 processing messages 107 that originated from live messages 104A-D associated with platforms 102A-D, classification module 108 may be trained on historical messages. FIG. 1B is a block diagram 100B of a classification module, according to some embodiments. In FIG. 1B, classification module 108 may receive historical messages 115. Historical messages 115 may be messages that may have previously been issued by platforms 102A-D or may have been manually or automatically configured using user interface module 116. Historical messages 115 may include messages that include issues, failures or errors, messages that include conversations associated with fixing the issues, failures, or errors, messages that include solutions to the errors, and messages that indicate the outcome of the solution, e.g. whether the solution was a success or a failure.

In some embodiments, historical messages 115 may be stored or configured in a file, e.g. a training file or a database. Further, historical messages 115 may have known message types, e.g. a recommendation type, an issue or an error type, a conversation type, or successful (or unsuccessful) resolution type.

During training, classification module 108 may receive historical messages 115. Language processing module 110 may determine the content of each message in historical messages 115 by tagging the words and identifying relationships between the words within each historical message 115. Machine learning model 112 may use the tags and relationships to classify historical messages 115 into different message types.

During training, machine learning model 112 may also use metadata in the message to classify the message into different message types. Metadata, such as whether a message is a first message, last message, or the message is in the middle of the message chain, can be found in messages, that are, e.g. email messages or text messages. This metadata may be located in the header of an email message in some instances. Machine learning model 112 may use the metadata to determine whether the message is included in a message chain that is associated with the same issue or error. The message chain may include multiple messages associated with the same error and may include message types that are error messages, conversation messages, resolution messages, and success messages. Machine learning model 112 may determine that the message is included in the message chain using one or more identifiers in the metadata that are, for example, present in all messages in the message chain and that all have the same value. In another example, the metadata may include an identifier that points to or includes an identifier of a previous message in the message chain. In this way, a first message in the message chain would have a null or indefinite identifier which indicates that it is the first message in the chain. Machine learning model 112 may also determine the location of the messages in the message chain using a timestamp. For example, a first message in the message chain may have an earliest timestamp, the last message in the message chain may have the latest timestamp, and messages that chronologically include timestamps between the earliest timestamp and the latest timestamp are the middle messages in the message chain.

Machine learning module 112 may also use the location of the messages in the message chain to further classify the messages or validate the classification based on content. In some embodiments, a first message in the message chain may indicate an error or issue, the middle message(s) in the message chain may indicate a conversation which means a resolution is in progress, and message(s) toward the end of the message chain may indicate that a solution may have been identified and the error was successfully (or unsuccessfully) resolved. Accordingly, machine learning model 112 may use the metadata in the message to determine if the message belongs to a message chain and if so, identify the location of message in a message chain. Machine learning model 112 may then use the location of the message to classify the message or validate the classification based on content. For example, if the message is in the beginning of the message chain, machine learning model 112 may classify the message as an error or an issue message. If the message is in the middle of the message chain, machine learning model 112 may classify the message as a conversation message, e.g. a conversation to resolve the issue, and if the message is toward the end or is the last message in the chain, machine learning model 112 may classify the message as a solution message or a message indicating success or failure of the solution.

Machine learning model 112 may then compare the message types generated using machine learning model 112 to the known message types of the historical messages 115. As discussed above, the known message types may be stored in the historical message file or a database. The training may continue until machine learning model 112 classifies historical messages 115 into message types that are the same as the known message types within a configurable margin of error. Once trained, classification module 108 may store historical messages 115, content as identified by language processing module 110, and the classified message types of historical messages 115 in message store 114.

Going back to FIG. 1A, in an embodiment, classification module 108 may store messages 107, content of messages 107 as determined using language processing module 110, and the classifications (message types) of messages 107 in a message store 114. Further, because messages 107 that are included in a chain may be linked, message store 114 may store relationships between messages 107 having different classifications that are part of the same chain. Message store 114 may be a database or one of the memories discussed in FIG. 5 that is conducive for large scale storage and retrieval.

In an embodiment, once classification module 108 classifies messages 107 and stores the classified messages 107 in message store 114, user interface module 116 may identify messages 107 that have been classified as error messages and recommend a solution to the error messages, as will be discussed in detail below.

A trained classification module 108 may classify live messages 104A-D issued by platforms 102A-D. For example, classification module 108 may receive messages 107 that are aggregated and standardized messages 104A-D from platforms 102A-D. As classification module 108 receives each message in messages 107, classification module 108 may use language processing module 110 to tag the words and relationships in each message and identify the content of the message. Next, machine learning model 112 may use the tags and relationships to classify message into one of the message types. For example, machine learning model 112 may compare the tags and relationships in messages 107 to the tags and relationships that the machine learning model 12 determined for the historical messages 115 during training and then based on the comparison determine the message types for messages 107. The message, the message type associated with the message, and the content of message may be stored in message store 114. If machine learning model 112 is unable to classify the message into one of the stored or known message types, machine learning model 112 may create a new message type based on the message and its associated characteristics and store the new message type in message store 114. Alternatively, machine learning model 112 may classify the message as a catch all or an unclassified message type.

Once messages 107 are classified and catalogued in message store 114, message analytics system 117 may perform analytics on messages 107 that classification module 108 identified as having error message type and recommend solutions for the error messages. Analytics system 117 may include a user interface module 116, a search module 118, a recommendation module 120, and an analytics module 122 in some embodiments.

In an embodiment, user interface module 116 may receive and display one or more messages 107 that are classified as error messages, e.g. messages 107 having an error message type. For example, in response to a request for error messages, which may be user input or interface generated input, user interface module 116 may receive messages 107 from message store 114 or from classification module 108 (not shown) and display messages 107. Once messages 107 that are classified as error messages are displayed, user interface module 116 may receive input that selects one of the displayed messages 107, referred to as the selected error message. In response to the selected error message, first, search module 118 may search historical messages 115 stored in message store 114 to generate a set of message candidates for the selected error message. The set of message candidates may be a set of historical messages that classification module 108 previously classified as having error message type and with content that is similar to the content of the selected error message. To generate the set of message candidates, search module 118 may compare the message type of the selected message to the message types of historical messages 115 and the content of the selected error message to the content of historical messages 115. For example, search module 118 may match the error message type of the selected error message to the historical messages 115 that have error message type and then compare the content of the selected error message to the content of the historical messages 115 that have error message type. Search module 118 may compare the content using the tags and relationships associated with historical messages 115 to the tags and relationships associated with the selected error message.

Second, once search module 118 determines the set of message candidates, recommendation module 120 may determine recommended solution(s) for the selected error message. To determine the recommended solution, recommendation module 120 may analyze the historical messages 115 that are related to the messages in the set of message candidates. For example, recommendation module 120 may identify historical messages 115 that are classified as solution messages and are related to the messages in the set of message candidates. A solution message may be one of historical messages 115 that is in the same message chain as the message in the set of message candidates. Alternatively, a solution message may be a message that classification module 108 has linked as a solution to the message in the set of message candidates. Recommendation module 112 may also determine whether solution messages are linked to historical messages 115 with message types that indicate that the solution messages were successful or unsuccessful solutions. If recommendation module 112 determines that a solution message is linked to the messages associated with the unsuccessful solution message type, the recommendation module 112 may remove that solution message as a potential solution to the selected error message.

Third, once recommendation module 120 has identified the solution message(s) from the set of messages candidates, recommendation module 120 may display the content of the solution messages as recommended solutions using user interface module 116.

In some embodiments, recommendation module 120 may further filter the solution messages into one or more recommended solution messages. In one example, recommendation module 120 may delete solution messages(s) that have the same or repeating solution and retain a single solution message. In another example, the recommendation module 120 may determine the probabilities of the solution messages being solutions to the selected message. The probability may be based on a number of the solution messages, the content match between the selected error message and the messages in the set of candidate messages, a number of solution messages that have the same solution, etc. In some embodiments, recommendation module 120 may sort the content of the solution messages in order of decreasing probabilities because the solution messages with higher probabilities are the likely solutions to the selected error message. In some instances, recommendation module 120 may further narrow the solution messages. For example, recommendation module 120 may recommended solution messages that have a probability above a configurable threshold or recommended a configurable number of solution messages with the highest probabilities.

In an embodiment, the content of the recommended solution messages may include a solution to a selected error message. Example recommended solutions may be to run a script and a script name, identity a file and store a file in a directory, fix access permissions e.g. to a file or directory, modify a code file in an application that generates an error and/or a code snippet that corrects the error, etc. Recommendations may also include a series of steps to be performed to rectify an error.

In some embodiments, messages 107 and the solutions to messages 107 when messages 107 have been resolved, may be added to message store 114 as historical messages 115. In this way, message store 114 may be updated with additional historical messages 115 that may be used to determine solutions to live issues.

In an embodiment, analytics module 122 may analyze classified messages stored in message store 114 for error trends. For example, analytics module 122 may parse the classified messages stored in message store 114 and identify that messages having the same error occur at start-up of an application, or messages that include the same permission error occur every day, etc. Analytics module 122 may also identify issue trends and hotspots in one or more applications monitored using platforms 102A-D. For example, analytics module 122 may parse classified messages in message store 114 from different time periods, e.g. between a first point in time and a second point in time, and identify messages that have the same repeating error, error messages that are generated by the same application, error messages that occur on the same computing device or a server in a distributed system, etc. Analytics module 122 may then identify a hot spot issue by determining whether there is a high number, such as a number above an error threshold, of certain types of messages which indicates a hotspot. Once analytics module 122 identifies a hotspot, analytics module 122 may display the hotspot and one of the identified error messages using user interface 116.

Figure 2:
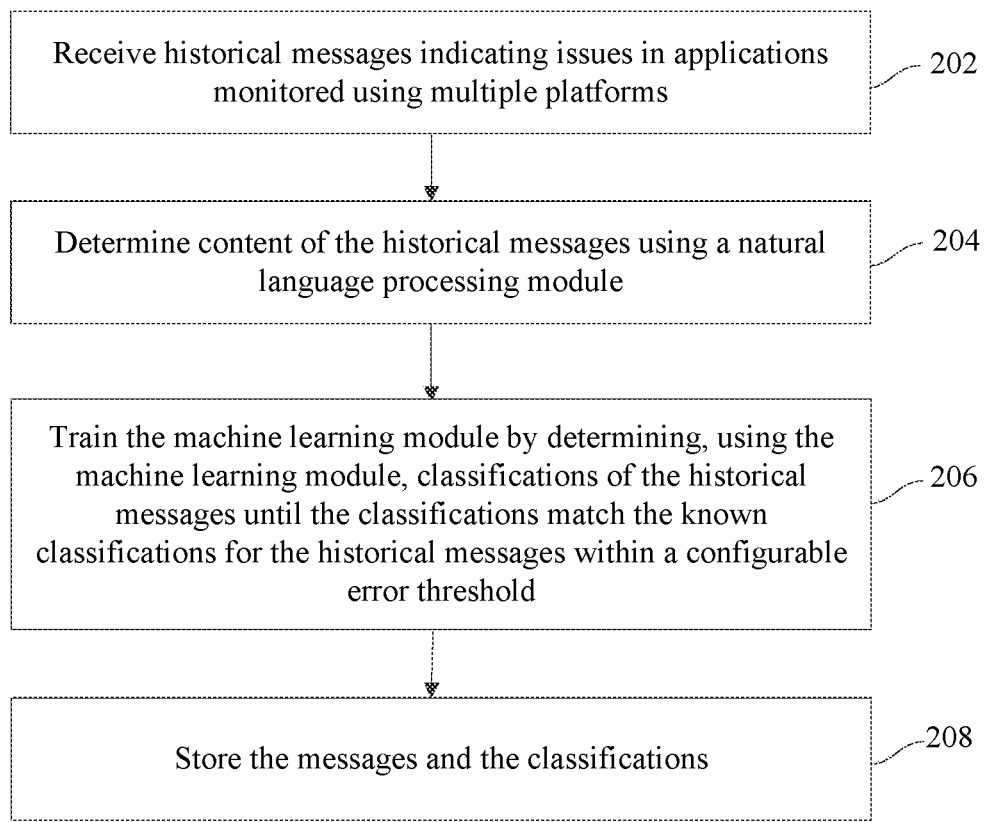
FIG. 2 is a flowchart of a method for training a classification system, according to an embodiment.

FIG. 2 is a flowchart of a method 200 for training a classification system, according to an embodiment. Method 200 may be performed using hardware and/or software components described in FIGS. 1A-B and 5. Note that one or more of the operations may be deleted, combined, or performed in a different order as appropriate.

At operation 202, messages are received. For example, messaging module 106 may receive historical messages 115. Historical messages 115 may include issues or errors that have previously occurred with applications monitored using platforms 102A-D. Historical messages 115 may also include messages indicating that the issues have been resolved or conversations that include instructions for resolving the issues. Historical messages 115 may also include classifications or message types for each historical message as well as links or relationships among historical messages 115. As discussed above, historical messages 115 may be stored in a file or message store 114.

At operation 204, the content of the historical messages is determined. For example, language processing module 110 may determine content of historical messages 115 by tagging the words in each message and establishing relationships between the words to understand the content of historical messages 115.

At operation 206, the machine learning module is trained. For example, machine learning model 112 may use the tags and relationships as input to classify the messages into message types, e.g. an issue or error message, a conversation message, a resolution message, or a successful/unsuccessful resolution to the message. The training may continue until the classifications for each message in historical messages 115 may match the known classifications associated with historical messages 115 with an error below a configurable error threshold. Once the error for classifying historical messages 115 is below the configurable error threshold, machine learning model 112 is trained and may process live messages 104A-D issued using platforms 102A-D.

At operation 208, the classified messages are stored. For example, historical messages 115, the classifications determined for historical messages 115, and the tags and relationships among historical messages 115 are stored in the messages store 114. Additionally, content of historical messages 115 as understood by language processing module 110 may also be stored in message store 114. Following operation 208, classification module 108 may classify live messages 104A-D.

Figure 3:
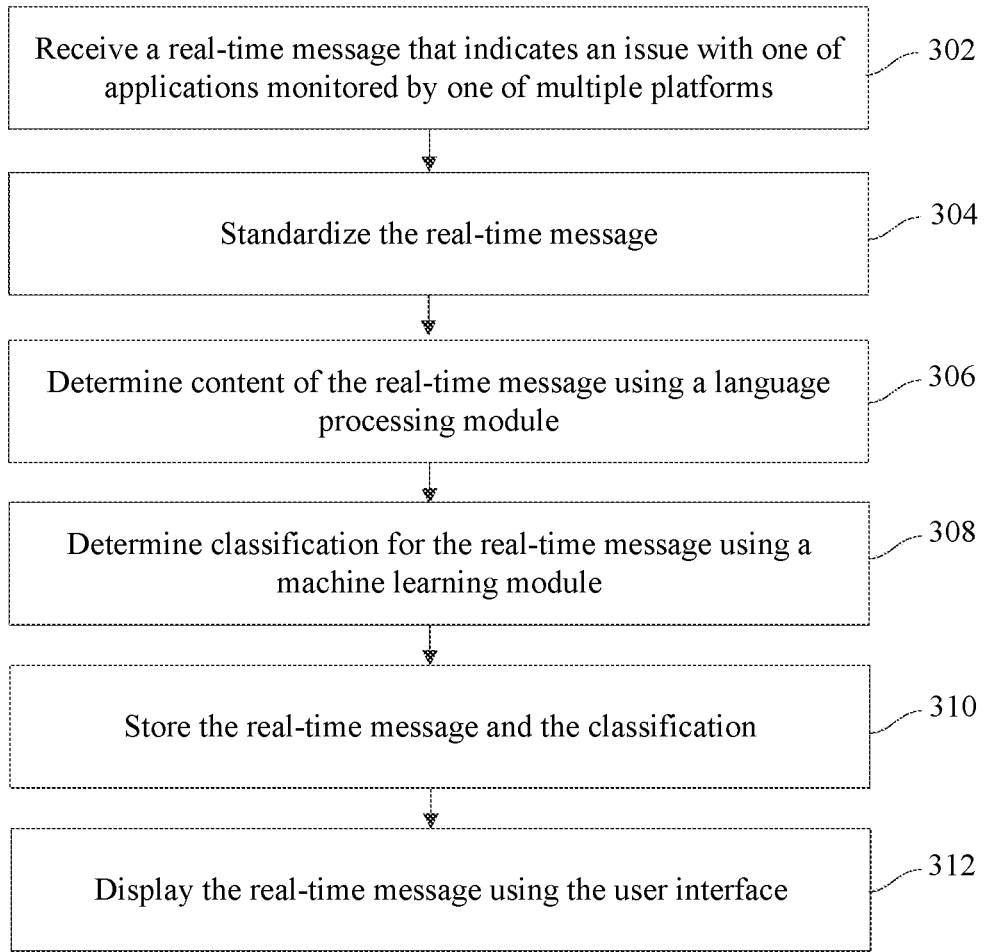
FIG. 3 is a flowchart of a method for processing a live message, according to an embodiment.

FIG. 3 is a flowchart of a method 300 for processing a real-time error message, according to an embodiment. Method 300 may be performed using hardware and/or software components described in FIGS. 1A-B and 5. Note that one or more of the operations may be deleted, combined, or performed in a different order as appropriate.

At operation 302, a real-time message is received. For example, the monitoring system may receive a real-time message that is one of messages 104A-D from one of platforms 102A-D. As discussed above, the message may indicate an issue or error with an application.

At operation 304, a real-time message is standardized. For example, messaging module 106 may standardize the format of the real-time message e.g., remove repeating words, unnecessary characters, etc. Messaging module 106 may also convert the message into a common format. This may occur when multiple platforms 102A-D generate messages 104A-D that have different formats, e.g. email messages, text messages, RSS or a JSON feeds from which templates with data are generated, etc. Messaging module 106 may standardize messages 104A-D in different formats into the same, common format.

At operation 306, a content of the real-time message is determined. For example, classification module 108 may use language processing module 110 to understand the meaning and content of the message by identifying tags and relationships between the words in the message.

At operation 308, a real-time message is classified. For example, classification module 108 may use machine learning model 112 to determine a message type, e.g. an issue or error message, a conversation message, a resolution message, or a successful/unsuccessful resolution for the real-time message. Since the real-time message originates at one of platforms 102A-D, classification module 108 should classify the real-time message as an error message.

At operation 310, the real-time message is stored. For example, classification module 108 may store the real-time message, the classification, and the tags and relationships between the words in the real-time message in data store 114.

At operation 312, the real-time message is displayed. For example, analytics system 117 may retrieve the real-time message (along with other real-time messages) that have an error message type from data store 114 and display the real-time message using user interface module 116.

Figure 4:
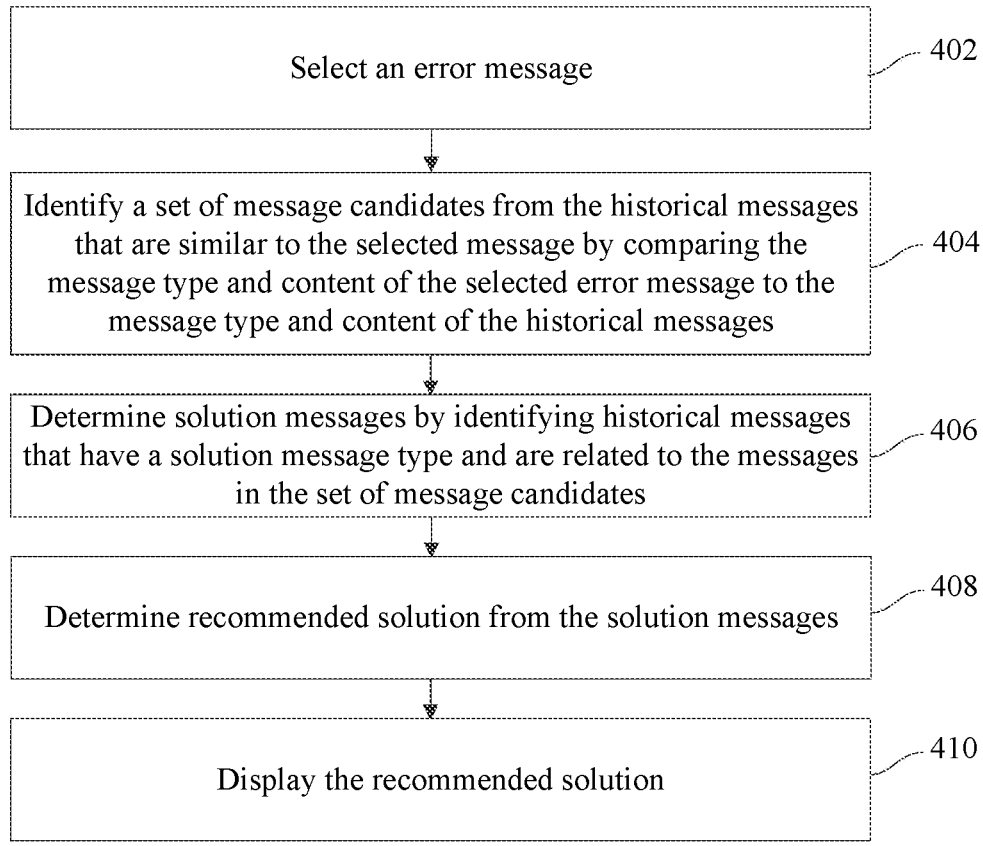
FIG. 4 is a flowchart of a method for determining a recommended solution to a live message, according to an embodiment.

FIG. 4 is a flowchart of a method for determining a recommended solution to a live message, according to an embodiment. Method 400 may be performed using hardware and/or software components described in FIGS. 1A-B and 5. Note that one or more of the operations may be deleted, combined, or performed in a different order as appropriate.

At operation 402, an error message is selected. For example, user interface module 116 may display real-time messages that the classification module 108 identified as error messages, e.g. real-time messages that have an error message type.

At operation 404, a set of message candidates are identified for the selected message. Search module 118 may use the classification of the selected error message (the error message type) and content of the selected error message to identify a set of message candidates from the historical messages 115 that have the same classification and the same or similar content. For example, search module 118 may identify a set of message candidates from the historical messages 115 that are classified as error messages. Search module 118 may then determine whether the selected error message and historical messages 115 that are classified as error messages have the same or similar content. One way that search module 118 may determine the same or similar content is to match the tags and relationships of the selected error message to the tags and relationships of historical messages 115.

At operation 406, solution messages are generated. For example, recommendation module 120 may use the set of message candidates identified in operation 404 to determine solution messages for the selected error message. For example, recommendation module 120 may determine messages in historical messages 115 that are classified as having a resolution message type and that are linked to the messages in the set of messages candidates. The solution messages may be messages that are in the same message chain as the messages in the set of messages that have been classified as error messages and have resolution message type. The solution messages may also be messages that were linked to the messages in the set of message candidates by language processing module 210.

At operation 408, a recommended solution is determined. For example, recommendation module 120 may determine one or more recommended solutions for the selected message from the solution messages by filtering our repeating solution messages or retaining solution messages that have probability above a probability threshold. Recommendation module 120 may then extract the content of the solution messages as the recommended solution(s). As discussed above, an example recommended solution may identify a missing path or a file on a computing device that executes an application monitored by one of platforms 102A-D, a permission error, or a code snippet to be included in a code file of an application.

At operation 410, the recommended solution is displayed. For example, user interface module 116 may display one or more recommended solutions to the selected message. Alternatively, user interface module 116 may display a listing of solution messages and upon receiving a selection of one of the solution messages display the content of the selected solution message as a recommended solution.

Figure 5:
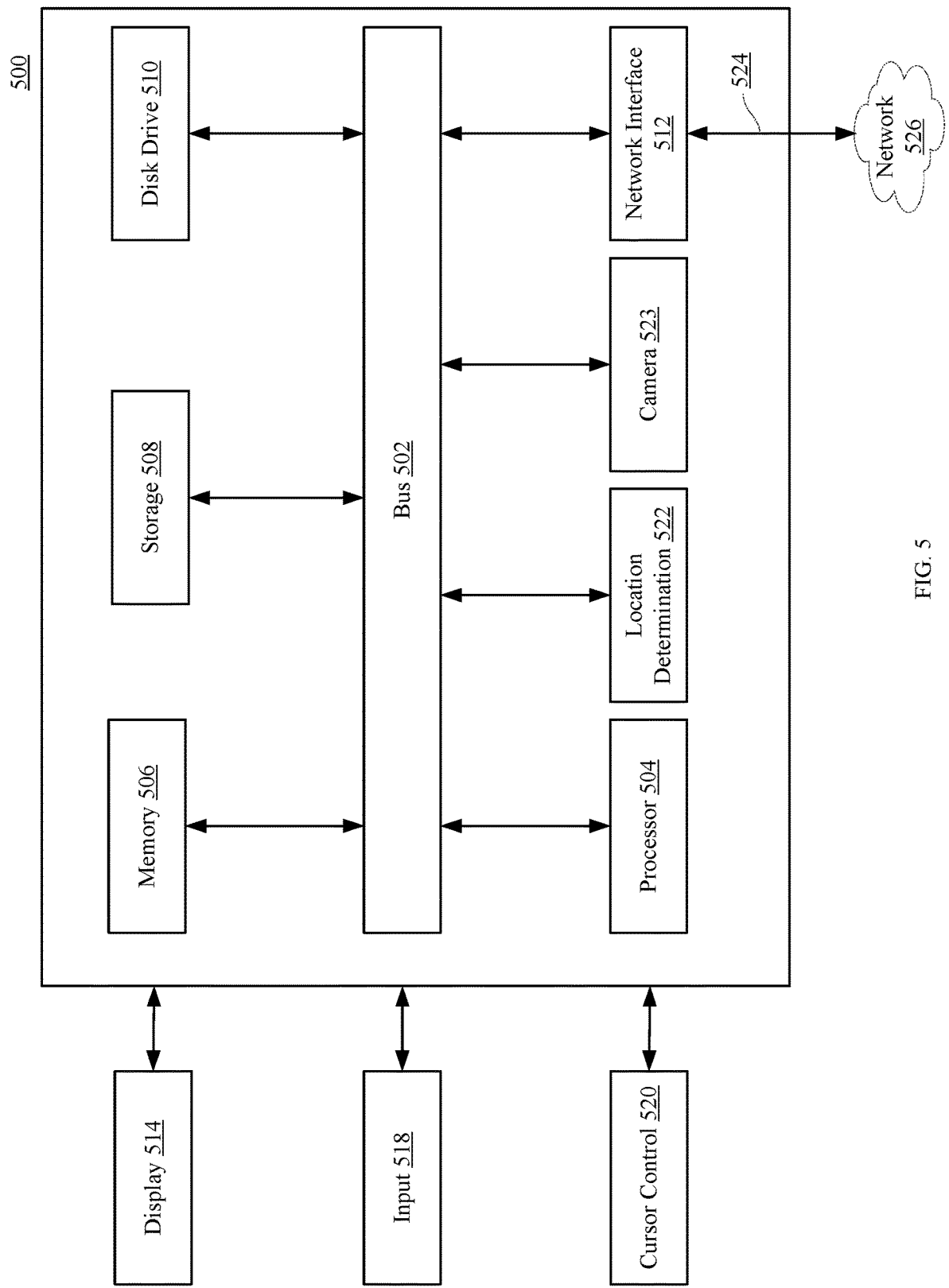
FIG. 5 is a block diagram of a computer system suitable for implementing one or more components or operations in FIGS. 1A-B, and 3-4, according to an embodiment.

Referring now to FIG. 5, an embodiment of a computer system 500 suitable for implementing, the systems and methods described in FIGS. 1A-B and 2-4 is illustrated.

In accordance with various embodiments of the disclosure, computer system 500, such as a computer and/or a server, includes a bus 502 or other communication mechanism for communicating information, which interconnects subsystems and components, such as a processing component 504 (e.g., processor, micro-controller, digital signal processor (DSP), graphics processing unit (GPU), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 518 (e.g., keyboard, keypad, or virtual keyboard), a cursor control component 520 (e.g., mouse, pointer, or trackball), a location determination component 522 (e.g., a Global Positioning System (GPS) device as illustrated, a cell tower triangulation device, and/or a variety of other location determination devices known in the art), and/or a camera component 523. In one implementation, the disk drive component 510 may comprise a database having one or more disk drive components.

In accordance with embodiments of the disclosure, the computer system 500 performs specific operations by the processor 504 executing one or more sequences of instructions contained in the memory component 506, such as described herein with respect to the mobile communications devices, mobile devices, and/or servers. Such instructions may be read into the system memory component 506 from another computer readable medium, such as the static storage component 508 or the disk drive component 510. In other embodiments, hard-wired circuitry may be used in place of or in combination with software instructions to implement the disclosure.

Logic may be encoded in a computer readable medium, which may refer to any medium that participates in providing instructions to the processor 504 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 510, volatile media includes dynamic memory, such as the system memory component 506, and transmission media includes coaxial cables, copper wire, and fiber optics, including wires that comprise the bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 500. In various other embodiments of the disclosure, a plurality of the computer systems 500 coupled by a communication link 524 (e.g., such as a LAN, WLAN, PTSN, and/or various other wired or wireless networks, including telecommunications, mobile, and cellular phone networks) may perform instruction sequences to practice the disclosure in coordination with one another.

The computer system 500 may transmit and receive messages, data, information and instructions, including one or more programs (i.e., application code) through the communication link 524 and the network interface component 512. The network interface component 512 may include an antenna, either separate or integrated, to enable transmission and reception via the communication link 524. Received program code may be executed by processor 504 as received and/or stored in disk drive component 510 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A method comprising:
   receiving a plurality of messages from a plurality of platforms, wherein the plurality of messages are associated with errors in a plurality of applications monitored by the plurality of platforms;
   determining content of a message in the plurality of messages using a language processing module executing on a processor;
   determining a classification for the message in the plurality of messages from the determined content with a machine learning model;
   comparing classifications of historical messages to the classification of the message;
   identifying, based on comparing the classifications, a first set of historical messages that match the classification of the message;

comparing content of the first set of historical messages to the content of the message in the plurality of messages;

identifying, based on comparing the content, a second set of historical messages that match the content of the message;

generating a set of message candidates based on the second set of historical messages, wherein the set of message candidates includes previous errors;

identifying at least one previous solution associated with the set of message candidates; and generating a recommended solution for the message using the at least one previous solution.

2. The method of claim 1, wherein the message in the plurality of messages indicates a real-time error that exists in an application monitored by a platform in the plurality of platforms and the recommended solution is a solution to the real-time error.

3. The method of claim 1, wherein the generating the recommended solution further comprises:

determining solution messages associated with the set of message candidates; and selecting at least one solution message from the solution messages as the recommended solution.

4. The method of claim 1, wherein the historical messages include an error message and a solution message.

5. The method of claim 1, wherein the recommended solution identifies at least a code snippet to be included in a code file associated with an application that caused a platform in the plurality of platforms to generate the message.

6. The method of claim 1, wherein a first message in the plurality of messages is in a first format and a second message in the plurality of messages is in a second format different from the first format.

7. The method of claim 1, wherein the recommended solution identifies a reason for an error in an application and a solution for rectifying the error.

8. The method of claim 1, wherein determining the classification for the message further comprises identifying metadata in the message that indicates a location of the message in a message chain associated with an error.

9. A method comprising:

receiving a plurality of historical messages indicative of a plurality of issues that occurred in a plurality of applications monitored using a plurality of platforms;

determining, using a natural language processing module executing on a processor, tags of the plurality of historical messages;

training a machine learning model to determine classifications of the plurality of historical messages from the tags of the plurality of historical messages until the classifications of the plurality of historical messages match known classifications of the plurality of historical messages within a configurable error threshold;

receiving a message indicative of a real-time error from a platform in the plurality of platforms; and identifying a recommended solution for the message using the natural language processing module and the trained machine learning model.

10. The method of claim 9, wherein the identifying the recommended solution further comprises:

identifying tags in the message that indicate the real-time error using the natural language processing module;

determining a classification for the message using the trained machine learning model from the tags;

identifying a set of message candidates form the plurality of historical messages by matching the tags and the classification of the message to the tags and classifications of the plurality of historical messages; and identifying the recommended solution using the set of message candidates.

11. The method of claim 9, wherein a historical message in the plurality of historical messages includes a known classification and text that is associated with the known classification.

12. The method of claim 9, wherein training the machine learning model further comprises:

comparing a known classification of a historical message in the plurality of historical messages to a classification of the historical message determined using the machine learning model.

13. The method of claim 9, wherein training the machine learning model further comprises:

determining a set of historical messages that are part of a message chain associated with an error; and classifying a historical message in the set of the historical messages using a position of the historical message in the message chain.

14. The method of claim 9, further comprising:

identifying a persistent issue in an application by processing a plurality of historical messages that were classified as error messages between a first time period and a second time period.

15. A system comprising:

a non-transitory memory storing instructions; and one or more hardware processors coupled to the non-transitory memory and configured to read the instructions from the non-transitory memory to cause the system to perform operations comprising:

receiving a plurality of messages from a plurality of platforms, wherein the plurality of messages are associated with errors in a plurality of applications monitored by the plurality of platforms;

determining a tag and a relationship between words in a message in the plurality of messages using a language processing module executing on a processor;

determining a classification for the message in the plurality of messages from the tag and the relationship between words in the message and using a machine learning module trained on historical messages;

generating a set of message candidates by matching classifications of historical messages to the classification of the message in the plurality of messages and matching tags of the historical messages to the tag of the message, wherein the set of message candidates includes previous errors; and generating a recommended solution for the message using the set of message candidates by identifying at least one previous solution associated with the set of message candidates.

16. The system of claim 15, wherein the message in the plurality of messages indicates a real-time error that exists in an application monitored by a platform in the plurality of platforms and the recommended solution is a solution to the real-time error.

17. The system of claim 15, wherein the operations further comprise:

determining solution messages associated with the set of message candidates; and selecting at least one solution message from the solution messages as the recommended solution.

18. The system of claim 15, wherein a first message in the plurality of messages is in a first format and a second message in the plurality of messages is in a second format different from the first format.

19. The system of claim 15, wherein the recommended solution identifies a reason for an error in an application and a solution for rectifying the error.

20. The system of claim 15, wherein determining the classification for the message further comprises identifying metadata in the message that indicates a location of the message in a message chain associated with an error.

* * * * *